Oct. 16, 1928.
B. J. PIERSON
1,688,152
FILTER
Filed Nov. 16, 1927
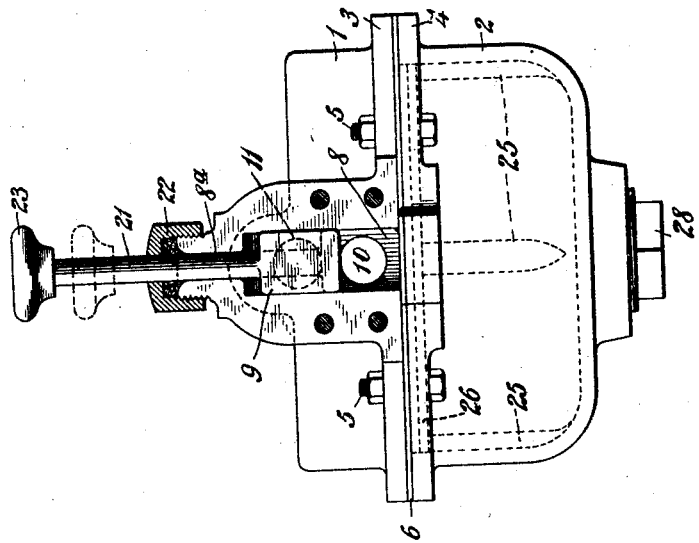

Patented Oct. 16, 1928.

1,688,152

UNITED STATES PATENT OFFICE.

BENJAMIN J. PIERSON, OF JOHNSTOWN, NEW YORK, ASSIGNOR TO D. H. P. MANUFACTURING COMPANY, INC., OF JOHNSTOWN, NEW YORK, A CORPORATION OF NEW YORK.

FILTER.

Application filed November 16, 1927. Serial No. 233,558.

My invention consists in the novel features hereinafter described, reference being had to the accompanying drawing which illustrates one embodiment of the same, selected by me for purposes of illustration, and the said invention is fully disclosed in the following description and claims.

The object of my invention is to provide a very simple filter for water (or other liquids) having a single back wash valve instantly movable from its normal position, to a position in which the water is passed in reverse direction through the filtering screen, or screens, to remove any foreign matter which has collected thereon and may be as quickly restored to normal position, the filter being provided with a sediment bowl, a baffle plate interposed between it and the inlet port through which the water to be filtered enters, said sediment bowl being provided with a clean-out aperture, and removable closure therefor.

In the accompanying drawings,

Fig. 1 represents a vertical sectional view of my improved filter.

Fig. 2 is a transverse section through the back-wash valve on line 2—2 of Fig. 1.

My improved filter consists of a hollow body which is preferably formed of cast metal, as aluminum for example, and comprises the upper member 1, and lower member, 2, provided with meeting flanges, 3, 4, united upon a gasket, 6, by screws or bolts, 5, or connected together in any other desired way so as to be liquid tight. The upper body member is provided with an inlet aperture, 7, communicating with a vertically movable, quick acting gate valve, 9, for controlling the inlet port, 10, adjacent to the lower portion of the valve chamber, and the back-wash port, 11, located above the inlet port, 10, and both communicating with the interior of the hollow body. The upper body member is also provided with a substantially horizontal filtering member which forms a partition between the lower portion of the hollow body, and an outlet chamber, 12, in the upper part of the body member, 1, the filtering member being disposed between the inlet port, 10, and back-wash port, 11, and comprising a perforated supporting plate, 13, and one or more filter screens, 14, which may be formed of fine mesh, non-corrodible metallic wire gauze or any other suitable material preferably placed below the perforated supporting plate, 13. I prefer to provide the upper body member, 1, with an annular face, 15, to engage and support the marginal portions of the filter member, and a central depending lug, 16, to support the central portions thereof, and the filter member may be connected to the body member in any desired way. I prefer to connect the screen, or screens, and the perforated plate to the annular face, 15, by screws, 17, one of which is shown in Fig. 1, and to support the filtering member centrally by an attaching screw, 16ª, passing through a central aperture therein and clamping the filter member upon the central lug, 16.

The upper body member 1, is also provided with an outlet aperture, 18, communicating with the outlet chamber, 12, and provided with means for connecting it the delivery pipe, 19, leading to a faucet, or faucets. The inlet aperture, 7, is provided with means for connecting it with a service or supply pipe 20, from the source of supply. The valve, 9, is provided with a gate portion wide enough to close either the inlet port, 10, or back-wash port, 11, and its stem, 21, which is of less diameter than the back-wash port, extends through an aperture, 8ª, formed in the upper part of the body member, 1, which is provided with a stuffing box, 22. The valve stem, 21, is preferably smooth and provided at its upper end with a knob or handle, 23, so that the valve is quick acting. The normal position of the valve is its upper position, in which it closes the back-wash port, 11, leaving the inlet port, 10, open, and it will be held in its normal position by the friction of the stuffing box on the valve stem, although it may be held in raised position by other means if desired.

The lower member, 2, is provided at the side adjacent to the inlet port, 10, with horizontal shoulders, 24, conveniently formed by the upper faces of a plurality of inwardly extending lugs, 25, upon which is placed a horizontal baffle plate, 26, secured in position by screws, 26ª, threaded into said lugs, the said baffle plate extending entirely across the body, and approximately half way or more from the inlet port to the opposite wall of the body, and being supported substantially in alignment with the bottom portion of the inlet port so that the entering water (or other liquid) will spread out upon and sweep across the upper face of the baffle plate as it enters the filter body.

The bottom of the body member, 2, is provided with a clean-out aperture, 27, normally closed by a removable plug or closure, 28, which is preferably provided with a recessed portion, 29, which communicates with the interior of the main body and which will form a receiving cavity of smaller cross-sectional area than the sediment bowl.

Assuming that the filter is installed, for example, between the supply pipe, 20, and the delivery pipe, 19, the latter leading to the point or points of use where suitable faucets are provided, and the back-wash valve being in position to close the back-wash port and leave the inlet port open, the entire body of the filter will normally be filled with water, the flow of which is controlled by the faucets at the points of use. If a faucet is opened to draw water from the source of supply the water will enter the filter through the inlet port, 10, and spreading out laterally above the baffle plate after passing through said port, will have its velocity checked, tending to deposit any sediment carried by it upon the baffle plate, while the continued movement of the water along the upper face of the baffle plate in a general direction away from the inlet port will tend to sweep, or roll or move the deposited sediment over the inner edge, 26ª, of the baffle plate, where it will fall into the sediment bowl formed in the lower body member, 2. The water is drawn off through the outlet port, 18, above the filter member, and as this member extends entirely across the upper body member, and provides apertures throughout its area, having combined cross-sectional areas much greater than the cross-sectional area of the inlet port, the water passes upward through the filter member with very small velocity, straining foreign matter which has not been deposited and which is collected on the lower face of the filter member. During the periods when water is not passing through the filter, there will be opportunity for precipitation of further foreign matter or sediment, if any, from the water in the filter body, and this sediment will fall to the bottom of the filter chamber, or upon the baffle plate, and in the latter case will be swept off of the baffle plate into the sediment bowl the next time water is allowed to enter the port, 10.

Obviously in the use of any filter for water, there will collect upon the filter member, foreign matter which, if it remains, provides a breeding ground for bacteria, and if permitted to remain too long may form a coating through which all the water must subsequently pass. It is desirable to have the filter member cleaned frequently and to so construct it that this may be easily done. It will be seen that in my filter, it is only necessary to depress the quick acting valve, which will close the inlet port, 10, and open the back-wash port, 9, and to open the clean-out aperture when the water from the service pipe, 20, will enter the outlet chamber, 12, from which it cannot pass into the delivery pipe while the faucets are closed, and the water will therefore be forced downward through the filter member, cleaning the lower face of the screen in the most efficient manner, and discharging the foreign matter removed therefrom as well as that in the sediment bowl, through the clean-out aperture. When the water runs clear, the plug or closure, 28, can be replaced to prevent waste of water and the valve can be instantly lifted into its normal position, and the filter is ready for further operation. If any foreign matter from the lower face of the filter member should remain on the baffle plate, it would be swept off into the sediment bowl as soon as a faucet was opened, and water enters the filter through the inlet port.

What I claim and desire to secure by Letters Patent is:—

1. A filter comprising a hollow body having an outlet chamber in its upper portion, and a sediment bowl in its lower portion, a horizontal filter member separating the outlet chamber from the sediment bowl, and provided with an inlet port communicating with said body below the filter member, and an outlet port communicating with said outlet chamber, and a horizontally disposed baffle plate located adjacent to the lower edge of the inlet port, and extending therefrom less than all the way to the opposite side of the hollow body and having portions of greater width than the inlet port, whereby the entering liquid will spread laterally upon and over said baffle plate, and deposit sediment thereon, which will be carried off of said plate by the forward movement of the liquid and be deposited in the bottom of the sediment bowl.

2. A filter comprising a hollow body having an outlet chamber in its upper portion, and a sediment bowl in its lower portion, a horizontal filter member separating the outlet chamber from the sediment bowl, and provided with an inlet port communicating with said body below the filter member, and an outlet port communicating with said outlet chamber, and a horizontally disposed baffle plate located adjacent to the lower edge of the inlet port, and extending therefrom less than all the way to the opposite side of the hollow body and having portions of greater width than the inlet port, said body having an inlet aperture communicating with the inlet port and having a back-wash port communicating with the inlet aperture and with said body above the filter member, and a single valve mechanism for effecting the closing of one port and the opening of the other port when moved in either direction, said main body being provided with a clean-out aperture and a removable closure therefor.

3. A filter comprising a hollow body having an outlet chamber in its upper portion and a sediment bowl in its lower portion, a horizontal filter member separating the outlet chamber from the sediment bowl, and provided with an inlet port communicating with said body below the filter member, and an outlet port communicating with said outlet chamber, and a horizontally disposed baffle plate located adjacent to the lower edge of the inlet port, and extending therefrom less than all the way to the opposite side of the hollow body and having portions of greater width than the inlet port, said body being provided with an inlet aperture communicating with said inlet port, a back-wash port connecting the inlet aperture with the outlet chamber, and a gate valve having a gate portion for closing one of said ports at a time, and a valve stem of less diameter than said ports, extending to the outside of the hollow body, said body being provided with a clean-out aperture below said baffle plate, and a detachable closure for said aperture.

4. A filter comprising a hollow body provided with a horizontally disposed filter member dividing it into two chambers, said body having annular portions for engaging the marginal portions of the filter member, and a downwardly extending lug secured to said filter member, substantially centrally thereof, said body being provided at one side with a back-wash port communicating with the chamber above the filter member, and an inlet port communicating with the chamber below the filter member, and having an inlet port communicating with both ports, a gate valve for closing one or other of said ports, provided with a valve stem extending to the exterior of said body, a stuffing box for said valve stem, frictionally holding the valve in adjusted position, said body being provided with an outlet aperture above the filter member, and a clean-out aperture below the filter member, and a detachable closure for the clean-out aperture.

In testimony whereof I affix my signature.

BENJAMIN J. PIERSON.